United States Patent
Schatz et al.

(10) Patent No.: US 7,931,977 B2
(45) Date of Patent: Apr. 26, 2011

(54) INFORMATION STORAGE MEDIA

(75) Inventors: Günter Schatz, Radolfszell (DE); Manfred Albrecht, Constance (DE); Johannes Boneberg, Bermatingen (DE); Iidico Guhr, Constance (DE)

(73) Assignee: Universitat Konstanz, Constance (DE)

( * ) Notice: Subject to any disclaimer, the term of this patent is extended or adjusted under 35 U.S.C. 154(b) by 297 days.

(21) Appl. No.: 11/570,827

(22) PCT Filed: Jun. 16, 2005

(86) PCT No.: PCT/EP2005/006492
§ 371 (c)(1),
(2), (4) Date: Oct. 30, 2007

(87) PCT Pub. No.: WO2006/007909
PCT Pub. Date: Jun. 26, 2006

(65) Prior Publication Data
US 2008/0171233 A1    Jul. 17, 2008

(51) Int. Cl.
*G11B 5/66* (2006.01)

(52) U.S. Cl. ............... 428/832; 428/832.1; 427/131; 204/192.1

(58) Field of Classification Search .............. None
See application file for complete search history.

(56) References Cited

U.S. PATENT DOCUMENTS

| | | | |
|---|---|---|---|
| 6,146,761 A | 11/2000 | Hirotsu et al. | 428/402 |
| 6,472,047 B1 | 10/2002 | Kirino et al. | 428/141 |
| 6,743,503 B1 * | 6/2004 | Chen | 428/336 |
| 2003/0091865 A1 | 5/2003 | Chen et al. | 428/848.3 |
| 2004/0146747 A1 * | 7/2004 | Nemoto et al. | 428/694 T |
| 2004/0151947 A1 | 8/2004 | Rodmacq et al. | 428/836 |
| 2006/0021871 A1 * | 2/2006 | Kuo et al. | 204/192.15 |
| 2009/0086358 A1 * | 4/2009 | Van de Veerdonk et al. | 360/55 |

FOREIGN PATENT DOCUMENTS

JP    2003-317222    11/2003

OTHER PUBLICATIONS

Moritz et al.; "Patterned Media Made From Pre-Etched Wafers: A Promising Route Toward Ultrahigh-Density Magnetic Recording"; *IEE Transactions on Magnetics*, vol. 38, No. 4, Jul. 2002.
2007-521818; English translation of Japanese Office Action dated Jan. 6, 2010.

\* cited by examiner

*Primary Examiner* — Holly Rickman
(74) *Attorney, Agent, or Firm* — Renner, Otto, Boisselle & Sklar, LLP

(57) ABSTRACT

The present invention relates to information storage media, and more particularly, to ultra-high density magnetic information storage media which comprises a plurality of discrete islands of magnetic material.

19 Claims, 3 Drawing Sheets top view side view

INFORMATION STORAGE MEDIA

The present invention relates to information storage media, and more particularly, to ultra-high density magnetic information storage media which comprises a plurality of discrete islands of magnetic material.

Present day high density magnetic information storage media contain small magnetic grains, usually in a thin magnetic film. In these media, it is usual for one information storage bit to be stored in a region of the film which contains a large number of magnetic grains and which is magnetized coherently in one of two preferred directions (usually referred to as up or down), even though the actual direction of magnetization may not be perpendicular to the film or other form of media on which the magnetic grains are formed.

The demands of high density information storage have led to magnetic grains in the metal films with dimensions as small as 7 nm which in turn has resulted in a number of grains on the order of one hundred being contained within each individual information storage bit. Nonetheless, the recording medium remains fundamentally granular with grains that are ideally magnetically decoupled and the grains have a large dispersion by 20 to 30% in size. This granularity leads to media noise in the magnetic switching process, which gets worse as the bit size, hence the number of grains in a bit, becomes smaller. Although an ideal medium (with a constant grain size and containing N numbers of particles in each bit) results in a signal-to-noise ratio (SNR) proportional to $(N)^{1/2}$, the actual practical situation is much worse because of irregularities in particle size, particle packing and particle interactions due to exchange coupling and demagnetizing fields. Present day commercial hard disk storage media have a bit density of roughly 80 Gigabit/inch². Today's technology reaches physical limitation at about 500 Gigabit/inch².

In order to further increase the areal density, traditional engineering requires that all design parameters of the recording media be scaled to smaller dimensions.

These scaling laws involve in particular a reduction of the grain volume and a tighter grain size distribution to maintain SNR.

As the thermal stability of magnetization orientation of individual grains scales with the magnetic anisotropy constant, $K_u$, and grain volume, V, the magnetization of the grains may become unstable due to thermally activated fluctuations and data loss may occur. This phenomenon is also referred to as the 'superparamagnetic effect' and has become increasingly important in recent years as new magnetic hard disk drive products are designed for higher areal densities. One approach to delay superparamagnetism and to achieve higher areal densities is to compensate the decrease in grain size by increasing the magnetic anisotropy. However, high $K_u$ materials require higher switching fields to reverse the orientation of magnetization.

A widely discussed concept for producing monodisperse and extremely small grain structures (diameter 3 nm) is offered by the deposition of chemically synthesized magnetic nanoparticles (dispersion 5%) on substrate surfaces, so called nanoparticle media. Therefore, the small volume requires particles which consist of highly anisotropic materials such as FePt. This medium can be self-assembled in arrays of a single monolayer or multilayer in a simple and defined way over large areas and it should thereby be possible to realize storage densities of well over 10 Terabits/inch². This discovery has caused a huge stir in the hard drive industry. However, there are two key problems:

a) The FePt particles require an additional annealing step to about 600° C. to form the high $K_U$ chemically ordered structure ($L1_0$ phase). However, this annealing process leads to undesirable particle aggregation which induces magnetic coupling between the particles. There are currently intensive efforts to solve this problem using various approaches, but to date with moderate success.

b) No uniaxial orientation of easy axis of the magnetization orientation of the nanoparticle media is obtained during its application and the subsequent heating process, i.e. the anisotropy axes are distributed isotropically in the medium and those nanoparticle media are therefore unsuitable as magnetic storage medium. In this respect, despite intensive research work, there has not been made any promising progress.

Of particular importance with regard to the writability of high $K_u$ materials is tilting the anisotropy axis of a nanoparticle. Based on the Stoner-Wohlfarth model, different switching fields exist for single-domain particles with different angles α between the head field and the easy axes. For perpendicular media in a perpendicular recording system with a single-pole head, α is quite small where the switching field and its sensitivity to α are near to their maximum values. As an example, when a equals 0°, a change of α as small as 1° will lead to a significant drop of switching field from $H_k$ to 0.92 $H_k$. Therefore, in such a recording system, a broad switching field distribution will always exist even when easy-axis distribution is small. Use of tilted media is a possible way to solve the above problem. By adjusting the easy-axis direction in the tilted media, α can be tuned to the points where the sensitivity of switching field to α is near to its minimum. Moreover, as the switching field is also near to its absolute minimum at these points, high $K_u$ media are writable and can be used to increase the recording density and thermal stability. However, limited progress has been made to create tilted media.

From the above, then, it appears that the nanoparticle media approach provides significant limitations to pushing the media significantly further in the direction of smaller bit size and higher areal density, and therefore, the need is for a different approach to ultra-high density magnetic recording media.

It is therefore an object of this invention to provide an ultra-high density magnetic information storage media.

It is a further object of this invention to create a magnetic storage medium consisting of arrays of densely packed magnetic islands of regular size and shape and which utilizes several islands or one island per bit of information stored.

Still a further object of this invention is to provide magnetically decoupled islands which are in a single domain state.

It is also an object of this invention to provide a magnetic information storage medium which has a uniform orientation of the easy axis (anisotropy axis) which orientation can be tailored.

It is also an object of this invention to provide a method of manufacturing an ultra-high density magnetic storage medium with the above described characteristics.

According to the present invention, there is provided a high density magnetic information storage medium comprising magnetic islands composed of a magnetic film i.e. a multi-layered magnetic stack or alloy and formed over a substrate having a surface either patterned with a plurality of convex spherically shaped dots (protrusions) spaced apart from each other or with a plurality of concave spherically shaped holes (recession) spaced apart from each other, such that due to the spherical topography of the substrate surface a local variation of the deposited film thickness or composition is given along the substrate surface. The variation in thickness or composition is caused by the curvature of the topographic substrate on which the magnetic islands are deposited at a fixed deposition angle with respect to the surface normal of the substrate. The magnetic islands are configured that one bit of information is stored on several magnetic islands or ideally on only one island. Preferably each island is in the order of 3 to 50 nm in diameter and densely packed.

The magnetic information storage media of this invention preferably employs a self-assembly of monodisperse spherical particles in a densely packed two-dimensional array on a suitable substrate or a substrate having spherically shaped protrusions or recessions which can be produced by e.g. optical lithography, nanoimprint technology, dipping, hot embossing or e-beam lithography, in the substrate itself. Thereafter, a film of suitable magnetic material is deposited at a fixed deposition angle forming a uniform and regular array of magnetic nanostructures in the form of magnetic islands on the specifically patterned surface substrate. The magnetic film material on the topographic pattern must be a thin layer (1-20 nm) and have an exceedingly fine microstructure. One of a number of different types of material that can be used are Co/Pd multilayers with perpendicular magnetic anisotropy.

Perpendicular magnetic anisotropy observed in Co/Pd multilayer films is mainly given by the interface anisotropy between Co and Pd layers which points perpendicular to the interface layer or growth surface.

In particular, the tops of each spherical particle or dot, respectively, will be covered by the deposited magnetic film forming monodisperse single-domain magnetic island caps. The mechanism of magnetic isolation of the magnetic caps is related to two effects. First, each spherical particle has only six small contact areas between neighboring spheres which can transfer limited exchange interaction between the magnetic caps. Second, the curvature of the surface plays an important role for the deposited film thickness or composition. Assuming a uniaxial evaporation direction perpendicular to the substrate surface the spherical surface of the particle will lead to a reduction in Co and Pd thickness along the surface which in turn gives rise to a paramagnetic Pd—Co alloy at the outer surface area in particular at the contact area between neighboring particles. Therefore, no exchange interaction is present between particles. This mechanism of domain isolation is very effective using an extremely thin Co thickness for instance of only one atomic monolayer.

An advantage of this invention is that by changing the deposition angle the easy axis or anisotropy axis can be simply altered which results in tilted nanoparticle media. In particular in a perpendicular recording system the magnetic field is generated by an inductive coil and points perpendicular to the substrate surface. However the design of a head capable of generating a uniform and tilted field is challenging. Therefore, by adjusting the easy axis direction in the medium, a can be tuned to the required angle.

These and other objects and advantages of the present invention will become apparent to those skilled in the art after having read the following detailed description of the preferred embodiment.

FIG. 1 schematically shows the top view and the side view, respectively, on a magnetic medium according to a preferred embodiment of the present invention.

Figure 1:
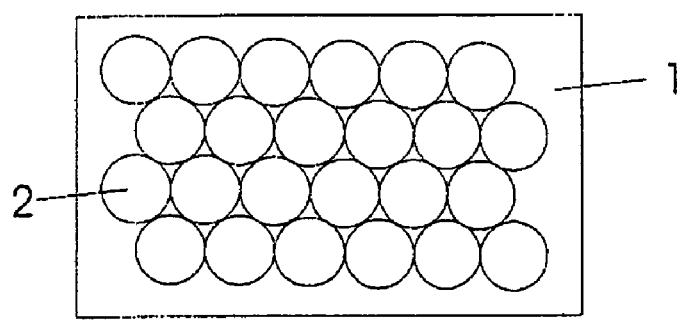
Figure 1:
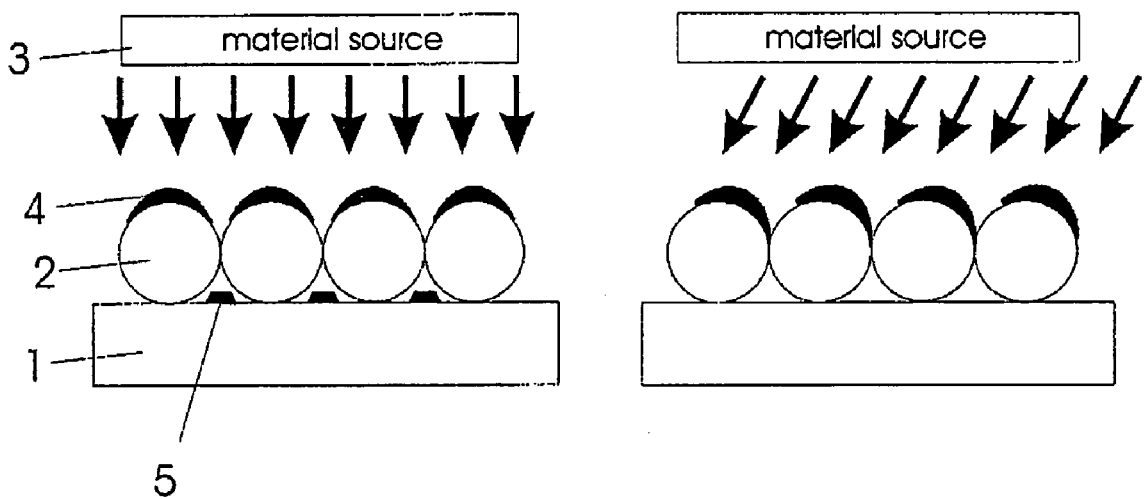

According to the present invention, there is provided a high density magnetic information storage medium comprising magnetic islands composed of a magnetic film, I.e. a multi-layered magnetic stack or magnetic alloy and formed over a substrate having a surface either patterned with a plurality of convex spherically shaped sots (protrusions) spaced apart from each other or with a plurality of concave spherically shaped holes (recession) spaced apart from each other, such that due to the spherical topography of the substrate surface a local variation of the deposited film thickness or composition is given along the substrate surface.

The substrate material is not subject to any limitation as long as the substrate has the specifically adopted, spherical shaped surface structure. For example, such a surface structure can be obtained by optical lithograpy, nanoimprint technology, dipping, hot embossing or e-beam lithography, etc. For example, a surface with a plurality of spherical, concave shaped (i.e.hole structured) dots can easily be obtained by imprinting techniques when using plastic substrates like for example polymethyl methacrylate (PMMA). Certainly, any other plastics can also be used.

Alternatively, in accordance with a preferred embodiment of the present invention the spherical shaped surface structure can be produced by a flat carrier substrate on which at least one underlayer made of densely packed, monodisperse spherical particles self-assembled in a two-dimensional array is formed so that a magnetic film is then applied over said underlayer to form magnetic islands on the topographic substrate.

The underlayer can be a densely packed particle monolayer or particle multilayer. The particles forming the underlayer can be magnetic or non-magnetic. Any particles may principally be employed for the built-up of the underlayer as long as they are spherical. In the framework of the present invention, particles having an elliptic form are encompassed. There is no particular limitation to the diameter of those particles. However, the diameter usually lies within a range of 3 to 500 nm. For example, the particles of which the underlayer is composed, can be monodisperse gold, glass, $Al_2O_3$, $ZrO_2$, $TiO_2$, $SiO_2$ or organic polymer particles like e.g. polystyrol (PS) particles. Alternatively, magnetic particles like FePt nanoparticles can also be used for the formation of such an underlayer. Those FePt nanoparticles can have a diameter of about 3 nm.

The magnetic film to form the magnetic islands on the topographic structure, can be composed of any magnetic multilayer system like Fe/Pt, Co/Pt or Co/Pd or of magnetic alloys like $CoPt_3$, FePt or SmCo.

In particular, the multi-layered magnetic stack forming the magnetic islands may comprise pairs of alternating layers of platinum and cobalt or palladium and cobalt. The number of pairs of alternating layers of platinum and cobalt or palladium and cobalt may be approximately between 5 and 50. For example 8, 9 or 10 pairs of alternating layers of platinum and cobalt or palladium and cobalt may be used. The overall thickness of the multi-layered magnetic stack may be in the range of approximately 1 to 50 nm (nanometer).

Preferably, the multi-layered magnetic stack includes layers containing any one of platinum and palladium, and layers containing cobalt stacked in an alternating arrangement, wherein each layer of the multi-layered magnetic stack has a thickness of less than or equal to approximately 3 nm. In a further preferred embodiment, the layers including any one of platinum and palladium in the multi-layered magnetic stack have a thickness of between approximately 0.5 and 2.5 nm, while the layers including cobalt in the mutl-layered magnetic stack have a thickness of between approximately 0.2 and 1.0 nm. Preferably, the alternating layers of any one of platinum and palladium and cobalt in the multi-layered stack consist essentially of face centered cubic (FCC) crystallites in a (111) orientation. This is induced by an additional Pd or Pt buffer layer in the thickness range between 1 and 20 nm.

In one preferred embodiment of the present invention, the easy axis of the magnetic islands is oriented perpendicular to the surface normal of the carrier substrate. In another preferred embodiment of the present invention, the easy axis of the magnetic islands can be oriented to a fixed angle ranging between 0 and about 700 with respect to the surface normal of the carrier substrate.

If desired, additional layers may be added over the magnetic film, such as one or more barrier layers or hard coat layers, respectively, to improve environmental stability, or to improve head flyability. For example, a layer of carbon may be added over the multi-layered stack to form a hard coat.

The carrier substrate may comprise glass, $SiO_2$, $Al_2O_3$, mica, ITO, polymers, metal like for example Al, or any other suitable carrier substrate material.

A further subject matter of the present invention relates to method for manufacturing such media, comprising the following steps:
(i) providing a substrate having a surface either patterned with a plurality of convex spherical dots (protrusions) spaced apart from each other or with a plurality of concave spherical dots (recessions) spaced apart from each other, and
(ii) depositing a magnetic film over said substrate surface to form magnetic islands on the topographic substrate, whereby due to the spherical topography of the substrate surface a local variation of the layer thickness or composition of the magnetic film is adopted along the substrate surface.

As mentioned above, such a surface structure can be obtained by nanoimprint-lithography, hot embossing, etc., but optical lithography can also be employed. For example, a surface with a plurality of spherical, concave shaped (i.e.hole structure) holes can easily be obtained by imprinting techniques when using plastic substrates like for example PMMA. Certainly, any other plastic material can also be used.

The distance from the center from one dot/hole to another one (pitch), i.e. between two adjacent dots/holes, usually lies within a range of from 3 nm to 500 nm. The dot density usually lies within a range of from 4 Gigadot/inch$^2$ to 90 Teradot/inch$^2$. The height/depth of those dots can lie within a range of from 3 to 500 nm. The diameter of those dots can lie within a range of from 3 to 500 nm.

In a preferred embodiment of the present invention, the method for manufacturing such media comprises the following steps:
(a) providing a carrier substrate,
(b) applying at least one underlayer made of densely packed, monodisperse spherical particles self-assembling in a two-dimensional array onto said substrate, and
(c) depositing a multi-layered magnetic stack over said underlayer to form magnetic islands on the topographic substrate, whereby due to the spherical topo-graphy of the substrate surface caused by the underlayer's particles a local variation of the layer thickness of the multi-layered magnetic stack is adopted.

In step (b) the application of the spherical particles onto said substrate to form a densely packed particle monolayer or particle multilayer as the respective underlayer can be performed by e.g. evaporative drying or spin coating of a suspension of the particles forming the underlayer. The latter can particularly be employed when larger particle diameters in the range of 150 to 500 nm are concerned. For example, the particles can be monodisperse gold, glass, $Al_2O_3$, $ZrO_2$, $TiO_2$, $SiO_2$, FePt or organic polymer particles like e.g. polystyrol (PS) particles. If organic polymer particles are employed, for example, a polystyrene latex stabilized by sulphate groups can be taken. These particles have negative surface charges due to the presence of the sulphate groups. This can be advantageous when the substrate used likewise has negative surface charges like for example glass. After they have been applied to the substrate, the particles can move more freely if they have the same surface charge as the carrier substrate, facilitating the regular arrangement which they are desired to have.

In step (c) the deposition temperature is preferably set within a range of 0° C. to 75° C., preferably room temperature in order not to destroy or adversely affect the arrangement of the spherical particles as a result of excessive heat. The deposition rate could be separately adjusted, for example, by means of a quartz oscillator or a mass spectrometer arranged in the deposition device. Typically, the deposition rate is adjusted to approximately 0.01-0.02 nm/s. For example, when a Co/Pd or Co/Pt multi-layered stack is concerned, deposition of Pt or Pd and Co is performed preferably by means of sputter technology or molecular beam epitaxy; however deposition by means of CVD or MOCVD methods is conceivable as well.

By means of the present invention, magnetic islands composed of a magnetic film, preferably a Co/Pt or Co/Pd multilayer, more preferably Co/Pd multilayer, can be obtained, which with a suitably selected individual layer thickness, on account of the interface anisotropy, has a high perpendicular anisotropy (easy axis of the magnetization is perpendicular to the substrate surface). However, the present invention also advantageously enables the production of tilted media. Since the easy axis of the magnetization is determined by the growth direction of the multi-layered magnetic stack, by oblique deposition like oblique sputtering the easy axis can be set against the substrate surface in any manner due to the spherical-symmetrical patterned surface of the substrate itself or produced by the underlayer' particles. Such media (tilted media) which possess an anisotropy axis oblique to the surface of the carrier substrate are promising storage media, since due to the angle between the anisotropy axis and the magnetic field applied (perpendicular to the magnetic medium's surface), lower magnetic write fields are required for the magnetic reversal. Further, when the deposition of the multi-layered magnetic stack onto the underlayer made of spherical particles is carried out by oblique deposition, the substructures produced by deposition of the magnetic material into the gaps between the densely-packed particles can be avoided.

FIG. 1 schematically shows the top view and the side view, respectively, on a magnetic medium according to a preferred embodiment of the present invention having formed on a carrier substrate 1 an underlayer made of densely packed, monodisperse spherical particles 2 self-assembled in a two-dimensional array on which magnetic islands 4 ("caps") are deposited. Reference number 3 represents a material source like a molecular beam epitaxy installation. On the left side, deposition of a magnetic stack onto the underlayer made of spherical particles 2 is carried out by deposition perpendicular to the surface normal, thereby forming magnetic islands 4 over the exposed part of the particles' curvature and leaving the gaps 5 between the densely-packed particles filled with magnetic material. On the right side, deposition of a magnetic stack onto the underlayer made of spherical particles 2 is carried out by oblique deposition giving rise to a tilted medium. Concurrently, filling of the gaps between the densely-packed particles is avoided.

Figure 3:
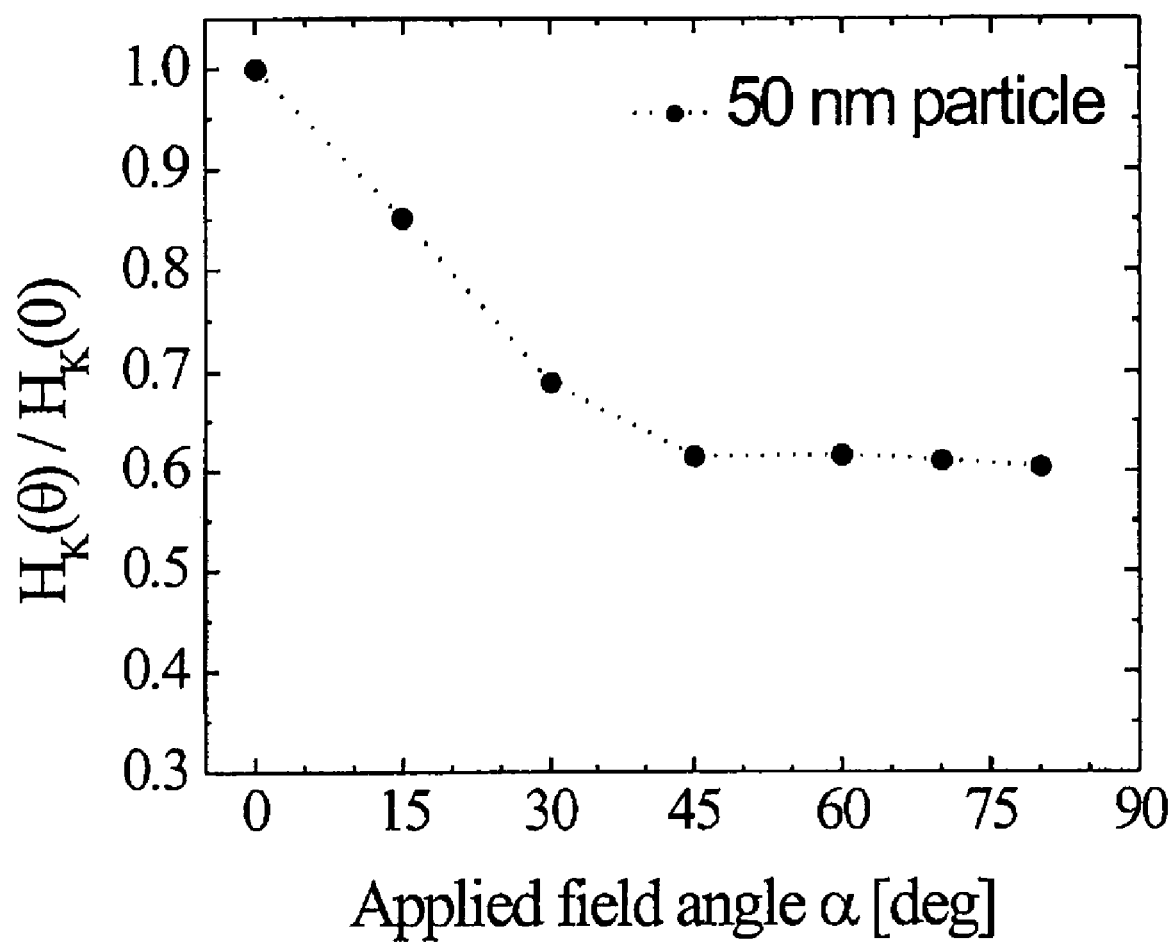
FIG. 3 is a graph showing the impact of the applied field angle on the degree of the switching field to reverse the orientation of magnetization (given for 50 nm particles).

FIG. 3 is a graph showing the impact of the applied field angle on the degree of the switching field to reverse the orientation of magnetization given for a magnetic medium obtained by particles (50 nm diameter) with subsequent deposition of a Pd(3 nm)[Co(0.3 nm)/Pd(0.8 nm)]×8 multilayer where the deposition direction is perpendicular to the carrier substrate surface. FIG. 3 clearly shows a significant drop of the switching field to reverse the orientation of magnetization dependent on the applied field angle.

Irrespective of whether a magnetic medium with a perpendicular anisotropy axis or with a tilted anisotropy axis is obtained, this anisotropy is independent of the starting material selected for the spherical-symmetrical patterned substrate itself or the self-assembled particles forming the underlayer. The specifically adopted surface structure, either produced in the substrate itself or gained by applying said at least one underlayer made of densely packed spherical particles formed over a carrier substrate, causes a local variation of the layer thickness or composition of the multi-layered magnetic stack or a magnetic alloy film due to the spherical topography of the substrate or the underlayer, respectively, on which the magnetic film is applied, i.e. resulting in a reduction in the layer thickness of the magnetic stack or a variation in composition depending on the point of curvature of the specifically patterned surface substrate or the underlayer's particles, respectively.

This decrease in layer thickness leads to a reduction in magnetic layer thickness, which with sufficiently thin films leads to a disappearance of the magnetic moment at the particle edges. For example, in the case of a Co/Pd or Co/Pt multilayer, this decrease in layer thickness leads to a reduction in the Co single layer thickness, which with sufficiently thin films leads to a disappearance of the magnetic moment at the particle edges (contact surface with the neighbour). However, this has the effect of complete magnetic decoupling of the magnetic islands ("caps") from the neighbouring islands.

Figure 2:
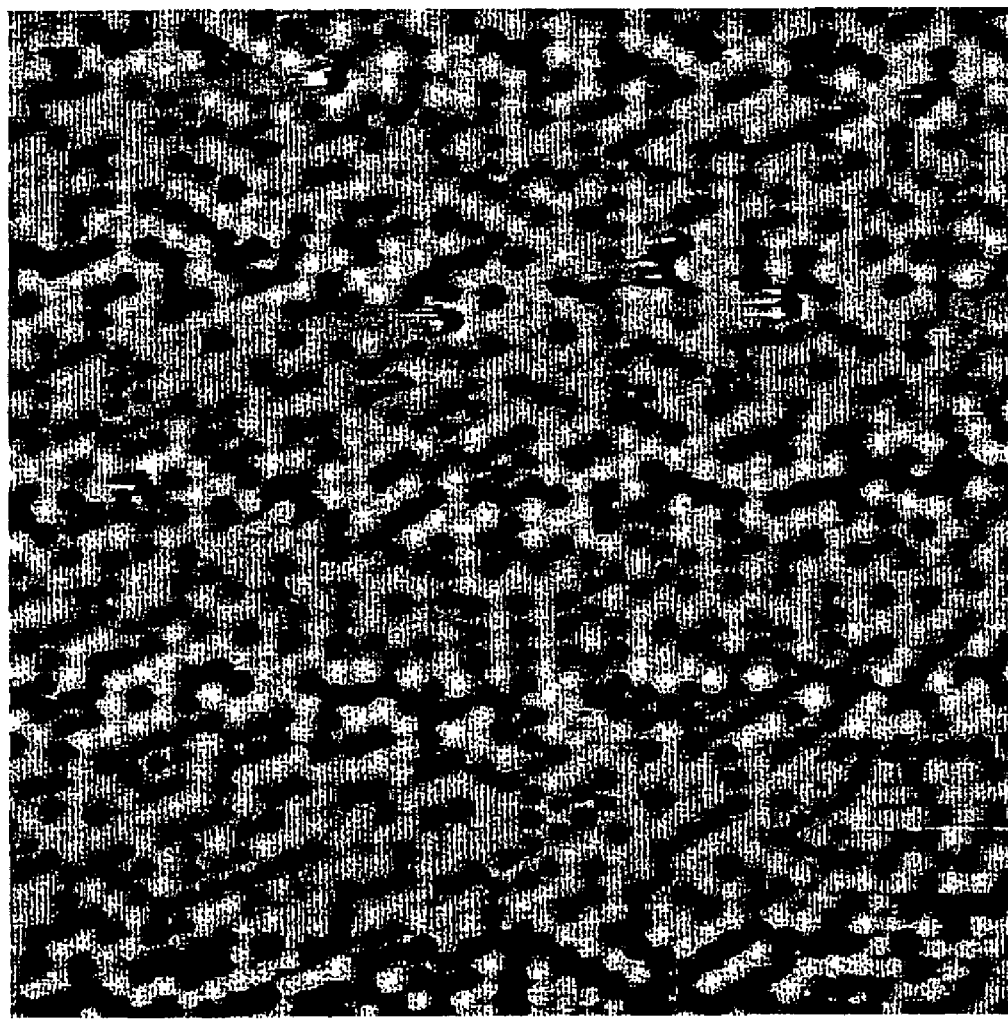
FIG. 2 shows a grey-scale scanning magnetic force microscopy image of a test specimen according to the present invention obtained using particles (110 nm diameter) with subsequent deposition of a Pd(3 nm)[Co(0.3 nm)/Pd(0.8 nm)]×8 multilayer.

These effects have been experimentally confirmed for example using particles (50 nm diameter) with subsequent deposition of a Pd(3 nm)[Co(0.3 nm)/Pd(0.8 nm)]×8 multilayer. Kerr magnetometry in polar geometry has been used to observe a strong perpendicular magnetic anisotropy with a remanence of 1 and a coercivity field of approximately 2 kOe with thermally stable magnetic islands. Furthermore, it has been found by magnetic force microscopy (MFM) that the magnetic islands are in a magnetically single-domain state and are magnetically decoupled with respect to the neighbouring islands. FIG. 2 shows a grey-scale scanning magnetic force microscopy image of a test specimen obtained using particles (110 nm diameter) with subsequent deposition of a Pd(3 nm)[Co(0.3 nm)/Pd(0.8 nm)]×8 multilayer.

The magnetic medium according to the present invention can be used as a magnetic storage medium, a magneto-optical storage medium or a magnetic sensor.

The present invention is described in more detail by the following example, without any limitation thereto.

Cleaning of the glass substrates:
The substrate used is commercially available glass (Menzel-Gläser, thickness 0.5-0.6 mm), which is cleaned using a standard procedure before the application of the particle suspension:
 twice for in each case 5 min at room temperature in triple deionised water (Millipore) in an ultrasonic bath
 30 min at 80° C. in triple deionised water, $H_2O_2$ and $NH_3$ (ratio 5:1:1)
 2 min at room temperature in an ultrasonic bath in triple deionised water
 10 min at 80° C. in triple deionised water, $H_2O_2$ and HCl (ratio 6:1:1)
 15 min at room temperature in an ultrasonic bath in Millipore
 blow dry glasses using argon Particles used:
Manufacturer: IDC (Interfacial Dynamics Corporation), Portland, Oreg., USA
Material: Latex (polystyrene), stabilized by sulphate groups The particles have negative surface charges on account of the sulphate groups. This is important since the substrate used likewise has negative surface charges. After they have been applied to the substrate, the particles can move more freely if they have the same surface charge as the substrate, facilitating the regular arrangement which they are desired to have.

Delivery: As a suspension in pure water (approximately 8% by weight of particles)
Particle diameter: Various particle sizes were used.
(i) 50 nm with a standard deviation of 8.9%
(ii) 270 nm with a standard deviation of 3.3%

Production of the particle masks:
Two different processes were used to produce the masks.
a) Evaporative drying (used for the 50 nm particles)
The commercial particle suspension is diluted to a 1% strength solution using triple deionised water. The dilute solution is then applied as uniformly as possible to the clean substrate (approx. 10 μl to 1 cm$^3$) with the aid of a pipette. The substrate is on a copper block which is positioned in a closable Plexiglas vessel and is inclined by approximately 100. In addition, contacts are fitted to this copper block, so that its temperature can be increased by approximately 2° C. by causing a slight current to flow through the copper block. This is intended to increase the evaporation of the solvent (in this case water). However, to prevent excessive evaporation, the lid of the vessel is closed. During the subsequent drying process (duration approx. 90 minutes, depending on the size of the substrate), the water evaporates very slowly, so that the colloids have a long time to arrange themselves regularly. The inclination of the substrate additionally enhances the process.

b) Spin-coating: (used for the 270 nm particles)
The commercial particle suspension is diluted using water and isopropanol in a ratio of 2:1:5. Then, the dilute solution is applied to the cleaned substrate with the aid of a pipette in a commercial spin coater which is inside a flow box. The process takes place at room temperature, with the spin coater operated for 10 seconds at 1900 revolutions per minute.

Deposition of the magnetic films:
To deposit the magnetic films, the glass substrate with the particle mask applied to it is introduced via a lock into a molecular beam epitaxy installation, where a magnetic film is deposited under ultra-high vacuum conditions with the aid of electron beam evaporators, e.g. as Pd(3 nm)[Co(0.3 nm)/Pd (0.8 nm)]×8/Pd(1 nm). The deposition process takes place at room temperature, in order not to destroy or adversely affect the particles as a result of excessive heat, and the deposition rate is typically approximately 0.01-0.02 nm/s.

The invention claimed is:

1. A high density magnetic information storage medium comprising magnetic islands composed of a magnetic film or magnetic alloy film and deposited over a substrate having a surface patterned either with a plurality of convex spherically shaped dots spaced apart from each other or with a plurality of concave spherically shaped holes spaced apart from each other, such that due to the spherical topography of the substrate surface a local variation in thickness or composition of the deposited film is formed along the substrate surface, wherein the magnetic film comprises layers each comprising one selected from platinum and palladium, and layers comprising cobalt, stacked in an alternating arrangement, wherein each layer of the magnetic film has a thickness of less than or equal to approximately 3 nanometers,
 wherein each magnetic island is magnetically decoupled from neighboring magnetic islands, and
 the easy axis of the magnetic islands is oriented in a fixed angle between 0° and 70° to the surface normal of the substrate.

2. The medium according to claim 1, wherein the spherical topography is produced using a flat carrier substrate on which at least one underlayer made of densely packed, monodisperse spherical particles self-assembled in a two-dimensional array is formed.

3. The medium according to claim 1, wherein the layers comprising one selected from platinum and palladium in the magnetic film have a thickness of between about 0.5 and about 2.5 nanometers.

4. The medium according to claim 1, wherein the alternating layers comprising one selected from platinum and palladium and cobalt in the magnetic film consist essentially of face centered cubic (FCC) crystallites in a (111) orientation.

5. The medium according to claim 1 wherein the easy axis of the magnetic islands is oriented in a fixed angle between 0° and 70° to the surface normal of the substrate,
wherein each magnetic island is magnetically decoupled from neighboring magnetic islands.

6. The medium according to claim 2, wherein the diameter of the underlayer's particles lies within a range of 3 to 500 nm.

7. The medium according to claim 2, wherein the underlayer's particles are chosen from monodisperse gold, glass, $Al_2O_3$, $ZrO_2$, $TiO_2$, $SiO_2$, FePt or organic polymer particles.

8. The medium according to claim 1, further comprising a hard coat formed over the magnetic film and/or a buffer layer formed under the magnetic film.

9. A method for manufacturing a high density magnetic information storage medium comprising magnetic islands composed of a magnetic film or magnetic alloy film and deposited over a substrate having a surface patterned either with a plurality of convex spherically shaped dots spaced apart from each other or with a plurality of concave spherically shaped holes spaced apart from each other, such that due to the spherical topography of the substrate surface a local variation in thickness or composition of the deposited film is formed along the substrate surface, comprising the following steps:
(i) providing a substrate having a surface either patterned with a plurality of convex spherically shaped dots spaced apart from each other or with a plurality of concave spherically shaped holes spaced apart from each other,
wherein step (i) comprises the following steps (a) and (b):
(a) providing a carrier substrate,
(b) applying at least one underlayer made of densely packed, monodisperse spherical particles self-assembling in a two-dimensional array onto said substrate, wherein step (b) is performed by spin coating or evaporative drying of a solution containing said spherical particles, and
(ii) depositing a magnetic film or magnetic alloy film over said surface substrate to form magnetic islands, whereby due to the spherical topography of the substrate surface a local variation of the layer thickness or composition of the magnetic film is adopted along the substrate surface,
wherein step (ii) comprises the following step (c):
(c) depositing a multi-layered magnetic stack over said underlayer to form magnetic islands, whereby due to the spherical topography of the substrate surface caused by the underlayer's particles a local variation of the layer thickness of the multi-layered magnetic stack is adopted,
wherein each magnetic island is magnetically decoupled from neighboring magnetic islands, and
the easy axis of the magnetic islands is oriented in a fixed angle between 0° and 70° to the surface normal of the substrate.

10. The method according to claim 9, wherein the distance from the center from one dot to another one lies within a range of from 3 nm to 500 nm and the dot density lies within a range of from 4 Gigadot/$inch^2$ to 90 Teradot/$inch^2$.

11. A method for manufacturing a high density magnetic information storage medium comprising magnetic islands composed of a magnetic film or magnetic alloy film and deposited over a substrate having a surface patterned either with a plurality of convex spherically shaped dots spaced apart from each other or with a plurality of concave spherically shaped holes spaced apart from each other, such that due to the spherical topography of the substrate surface a local variation in thickness or composition of the deposited film is formed along the substrate surface, comprising the following steps:
(i) providing a substrate having a surface either patterned with a plurality of convex spherically shaped dots spaced apart from each other or with a plurality of concave spherically shaped holes spaced apart from each other,
wherein step (i) comprises the following steps (a) and (b):
(a) providing a carrier substrate,
(b) applying at least one underlayer made of densely packed, monodisperse spherical particles self-assembling in a two-dimensional array onto said substrate, and
(ii) depositing a magnetic film or magnetic alloy film over said surface substrate to form magnetic islands wherein each magnetic island is magnetically decoupled from neighboring magnetic islands, whereby due to the spherical topography of the substrate surface a local variation of the layer thickness or composition of the magnetic film is adopted along the substrate surface,
wherein step (ii) comprises the following step (c):
(c) depositing a multi-layered magnetic stack over said underlayer to form magnetic islands, whereby due to the spherical topography of the substrate surface caused by the underlayer's particles a local variation of the layer thickness of the multi-layered magnetic stack is adopted, wherein in step (c) the deposition temperature is set within a range of 0° C. to 75° C.

12. The method according to claim 9 wherein in step (c) the deposition rate is adjusted to approximately 0.01-0.02 nm/s.

13. The method according to claim 9 wherein in step (ii) deposition is performed by means of sputter technology or molecular beam epitaxy.

14. The method according to claim 9 wherein in step (c) deposition is performed by means of sputter technology or molecular beam epitaxy.

15. The medium according to claim 1, wherein the layers comprising cobalt in the magnetic film have a thickness of between about 0.2 and about 1.0 nanometers.

16. The method according to claim 11, wherein the easy axis of the magnetic islands is oriented in a fixed angle between 0° and 70° to the surface normal of the substrate.

17. The medium according to claim 1 wherein each magnetic island is physically separate from neighboring magnetic islands.

18. The medium according to claim 5 wherein each magnetic island is physically separate from neighboring magnetic islands.

19. The method according to claim 9 wherein each magnetic island is physically separate from neighboring magnetic islands.

* * * * *